United States Patent
Dudar et al.

(10) Patent No.: US 11,111,894 B2
(45) Date of Patent: Sep. 7, 2021

(54) ENGINE STOP/START INHIBIT DURING VEHICLE SERVICE

(71) Applicant: Ford Global Technologies, LLC, Dearborn, MI (US)

(72) Inventors: Aed Dudar, Canton, MI (US); Mahmoud Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 16/374,584

(22) Filed: Apr. 3, 2019

(65) Prior Publication Data

US 2020/0318597 A1 Oct. 8, 2020

(51) Int. Cl.
*F02N 11/08* (2006.01)
*F02N 11/10* (2006.01)
*B60K 28/10* (2006.01)

(52) U.S. Cl.
CPC ...... *F02N 11/0818* (2013.01); *F02N 11/0803* (2013.01); *F02N 11/10* (2013.01); *B60K 28/10* (2013.01); *F02N 2200/08* (2013.01)

(58) Field of Classification Search
CPC .. F02N 11/0818; F02N 11/0803; F02N 11/10; F02N 2200/08; F02N 11/0829; B60K 28/10; F01N 11/0829

USPC ......................................................... 701/112
See application file for complete search history.

(56) References Cited

U.S. PATENT DOCUMENTS

| | | | |
|---|---|---|---|
| 4,510,396 A * | 4/1985 | Uchida | F02D 17/04 123/179.4 |
| 9,399,462 B2 | 7/2016 | Awadi et al. | |
| 9,790,911 B2 * | 10/2017 | Ishii | B60W 10/22 |
| 2015/0217778 A1 * | 8/2015 | Fairgrieve | B60W 10/06 701/37 |
| 2015/0224845 A1 * | 8/2015 | Anderson | B60G 17/052 701/37 |
| 2016/0273468 A1 * | 9/2016 | Kato | B60W 30/17 |
| 2016/0297415 A1 * | 10/2016 | Kato | F02D 41/065 |
| 2016/0297443 A1 * | 10/2016 | Kato | B60W 30/18018 |
| 2017/0197622 A1 * | 7/2017 | Books | B60R 16/0236 |
| 2019/0010910 A1 * | 1/2019 | Arnot | B60W 10/06 |
| 2019/0023256 A1 | 1/2019 | Khafagy et al. | |
| 2019/0046070 A1 * | 2/2019 | Brannan | A61B 5/062 |

* cited by examiner

Primary Examiner — Joseph J Dallo
Assistant Examiner — Scott A Reinbold
(74) Attorney, Agent, or Firm — Geoffrey Brumbaugh; McCoy Russell LLP (57) ABSTRACT

Systems and methods for operating an engine that may be automatically stopped and started without a human driver providing input to a device that has a sole function of stopping and starting the engine are presented. In one example, automatic engine starting is inhibited responsive to output of vehicle sensors that may be indicative of service being performed on a vehicle.

16 Claims, 5 Drawing Sheets

ENGINE STOP/START INHIBIT DURING VEHICLE SERVICE

FIELD

The present description relates to a system and methods for inhibiting automatic engine starting when vehicle service is being performed after an engine has been automatically stopped. The methods and system may assist a vehicle operator that has neglected to deactivate a vehicle before initiating service of the vehicle.

BACKGROUND AND SUMMARY

A vehicle may include an engine that may be automatically stopped and started without a human driver providing input to a device (e.g., key switch or pushbutton) that has a sole function of stopping and starting the engine. The engine may be automatically stopped to conserve fuel, and then, the engine may be automatically restarted to propel the vehicle or to charge a battery. The engine may be automatically stopped while the transmission that is coupled to the transmission is engaged in a gear or in park. Some drivers may absent mindedly leave the vehicle while the vehicle is activated after the engine is automatically stopped. If the vehicle's battery discharges to a lower level while the vehicle is activated, the engine may be automatically started to charge the battery. However, the engine may also be automatically started when maintenance is being performed on the vehicle after the vehicle's driver has exited the vehicle and after the engine has been automatically stopped. The person performing the maintenance on the vehicle may be startled if the engine automatically restarts. Thus, automatically restarting the engine when maintenance is being performed on the vehicle may be undesirable.

The inventors herein have recognized the above-mentioned limitations and have developed an engine control method, comprising: automatically stopping an engine responsive to vehicle operating conditions; and inhibiting automatic starting of the engine in response to an indication that service is being performed on a vehicle while the vehicle's engine compartment hood is closed.

By inhibiting automatic engine restarting after an automatic engine stop in response to an indication that maintenance is being performed on a vehicle, it may be possible to provide the technical result of preventing automatic engine starting when maintenance is being performed on a vehicle. Further, the automatic engine starting may be prevented when the maintenance performed on the vehicle is not under hood maintenance so that the engine does not suddenly start when the vehicle is elevated for service, for example. In one example, automatic engine restarting may be prevented based on a tire pressure change or a change in vehicle suspension height. The inhibiting of automatic engine restarting may be enforced up to a time when an engine start is specifically requested via a human driver.

The present description may provide several advantages. In particular, the approach may reduce the possibility of unwanted engine starts. In addition, the approach may increase owner or driver satisfaction by operating the vehicle in a way that may be preferred by the driver. Further, the approach may be implemented via a variety of different sensors such that it may be implemented at low or no additional vehicle cost.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
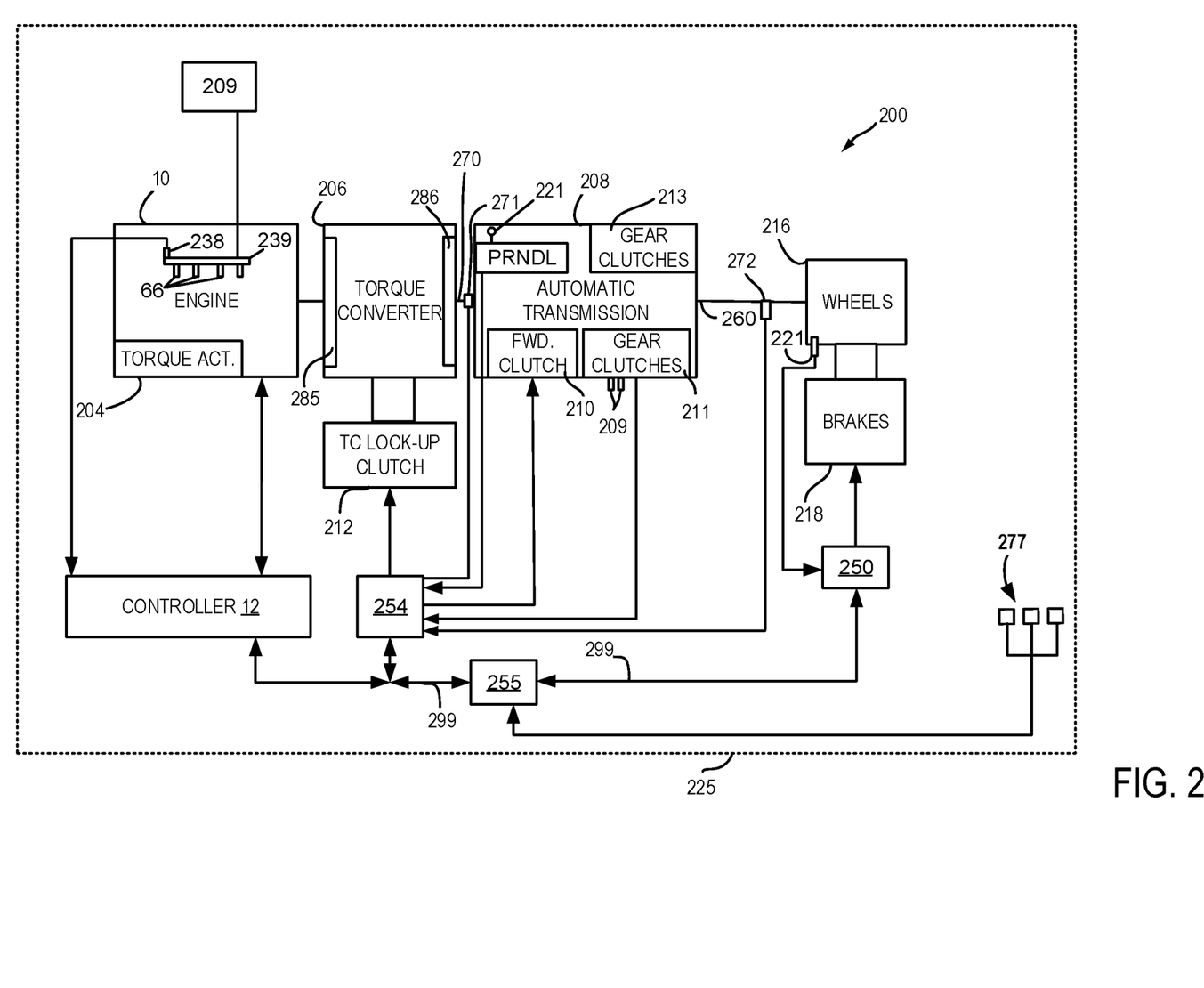
FIG. 2 shows a schematic diagram of an example powertrain or driveline including the engine of FIG. 1.
Figure 3A:
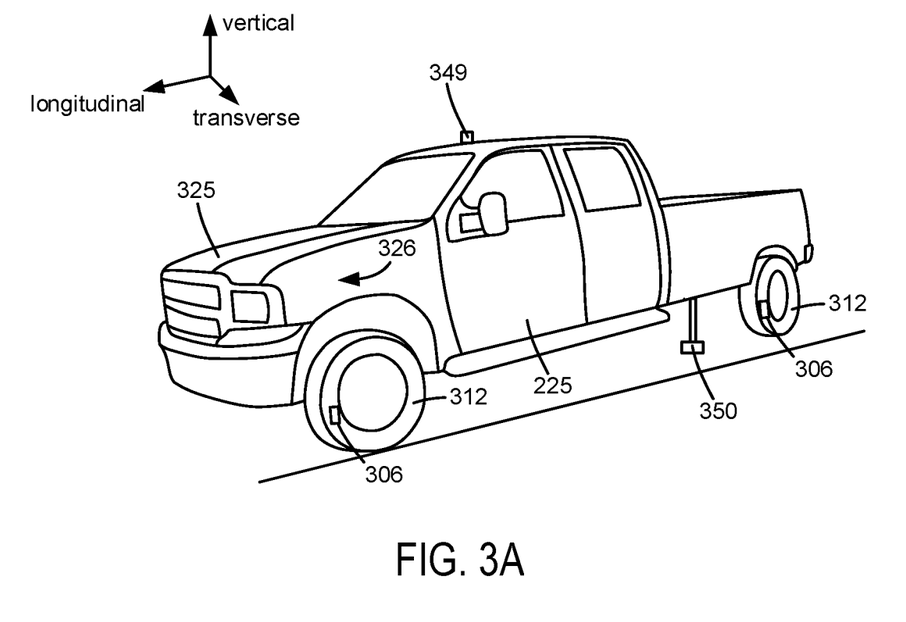
FIGS. 3A-3C show a schematic diagram of a vehicle and example sensor locations.
Figure 3B:
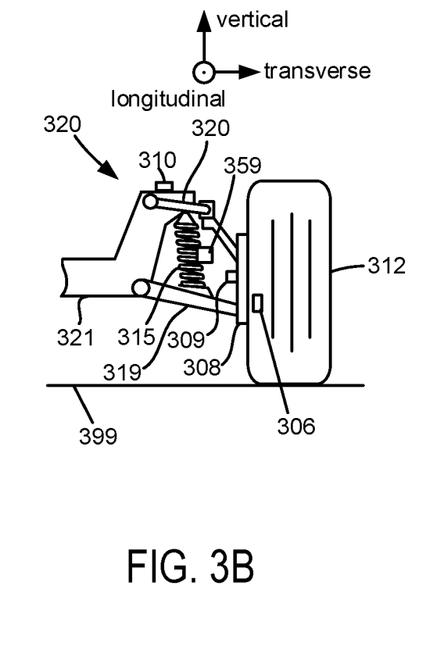
Figure 3C:
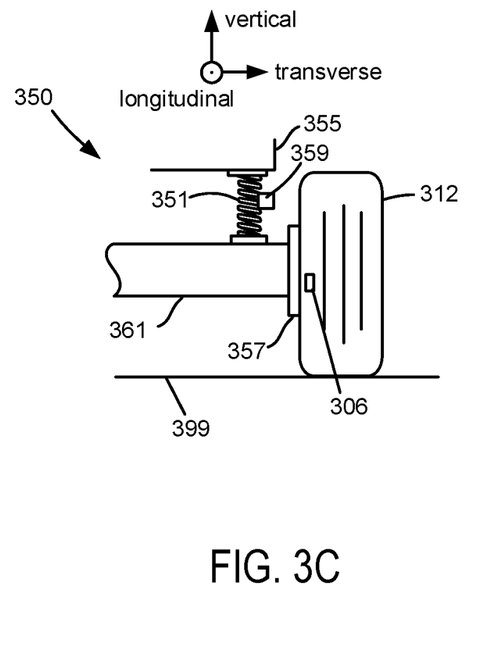

The present description is related to improving engine operation and vehicle operation during conditions after an engine has been automatically stopped. An engine of the type described in FIG. 1 may be automatically stopped and started to conserve fuel and reduce engine emissions. The engine may be included in a vehicle driveline as shown in FIG. 2. The driveline may be part of a vehicle that includes various sensors as shown in FIGS. 3A-3C. The engine and vehicle may be operated according to the method of FIG. 4. The engine and vehicle may operate according to the sequence of FIG. 5.

Figure 1:
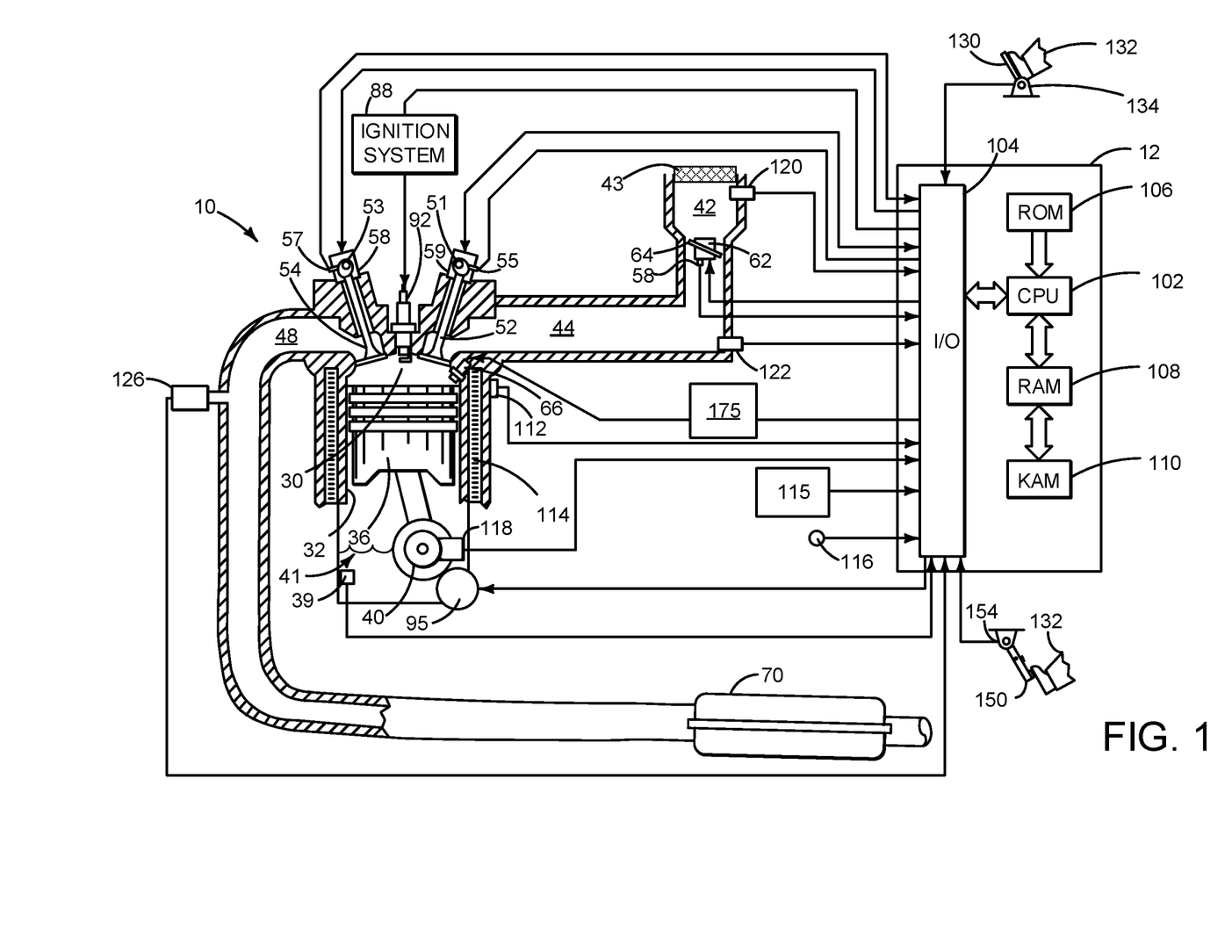
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40. Intake valves may be deactivated and held in a closed state via intake valve deactivating mechanism 59. Exhaust valves may be deactivated and held in a closed state via exhaust valve deactivating mechanism 58.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175, which includes a tank and pump. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Engine 10 may be rotated (e.g., cranked) via starter 95 during engine starting. Fuel and spark may be provided to engine 10 while starter 95 rotates engine 10. Combustion in engine 10 may accelerate engine 10 above a speed of starter 95 so that starter 95 decouples from crankshaft 40 after engine 10 starts.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; a level of oil 41 in engine 10 via oil level sensor 39; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Controller 12 may receive input from human/machine interface 115 (e.g., pushbutton or touch screen display). Controller 12 may start engine 10 in response to input to device 116 (e.g., key switch or pushbutton), which has a dedicated function of requesting engine starting and stopping via a human driver.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a block diagram of a vehicle 225 including a powertrain or driveline 200 is shown. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, transmission controller 254, and brake controller 250 to achieve driver input requests and other requests that are based on vehicle operating conditions.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254, and the brake controller 250 are standalone controllers.

In this example, powertrain 200 may be powered by engine 10. Further, torque of engine 10 may be adjusted via torque actuator 204, such as a fuel injector, throttle, etc. Engine 10 receives fuel via fuel injectors 66, fuel rail 239, and fuel tank 209. Fuel pressure in fuel rail 239 may be sensed via fuel pressure sensor 238. An engine output torque may be transmitted to impeller 285. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210 for activating gears 213 (e.g., gears 1-10). Automatic transmission 208 is a fixed ratio transmission that may operate according to a position of shifter 221. Shifter 221 may assume one or positions of park (P), reverse (R), neutral (N), drive (D), or low (low). The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates the requested driver demand torque to the engine. Vehicle system controller 255 requests the engine torque from engine controller 12. If engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed.

Accordingly, torque control of the various powertrain components may be supervised by vehicle system controller 255 with local torque control for the engine 10, transmission 208, and brakes 218 provided via engine controller 12, transmission controller 254, and brake controller 250.

As one example, an engine torque output may be controlled and/or limited by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to vehicle situational awareness sensors (e.g., cameras, microphones, and range detecting systems including radar, laser, and sonic transmitting and sensing devices), transmission hydraulic pressure sensors (e.g., gear clutch fluid pressure sensors), tire pressure sensors, suspension height sensors, inertial sensors (e.g., accelerometers, yaw, pitch, and roll sensors), and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability.

Referring now to FIG. 3A, an example vehicle 225 in which engine 10 may reside is shown. Directions relative to vehicle 225 are indicated via longitudinal, vertical, and transverse directional arrows. Vehicle 225 includes a 360 degree camera 349 that may sense movement within a threshold distance of vehicle 225, and 360 degree camera 349 may have a 360 degree field of view around vehicle 225. Each vehicle tire 312 may include a pressure sensor 306 for informing vehicle controller (e.g., 255 shown in FIG. 2) of pressure in tires 312. Vehicle 225 also includes an engine compartment hood 325 that at least partially covers engine compartment 326. Engine compartment hood 325 is shown in a closed position. Engine compartment 326 houses engine 10 shown in FIG. 1.

From time to time, vehicle elevating device or jack 350 may be used to elevate vehicle 225 for service. For example, jack 350 may be placed near a wheel so that vehicle 225 may be elevated near the wheel so that tire 312 may be rotated or serviced. Further, jack 350 may be used to elevate vehicle 225 for servicing brakes, fuel filters, and performing oil changes. When jack 350 elevates one wheel, pressure in the tire that is attached to the wheel may be reduced since external load on the tire has been reduced or removed. Further, when one wheel is elevated, pressures in the other vehicle tires may increase due to additional external load being applied to the tires that remain in contact with the ground.

FIG. 3B shows an example chassis suspension 320 for vehicle 225 or a similar vehicle. Directions relative to vehicle 225 and suspension 320 are indicated via longitudinal, vertical, and transverse directional arrows. Tire 312 is mounted to a wheel (not shown) and the wheel is mounted to hub 308. Hub 308 is mechanically coupled to lower control arm 319 and upper control arm 320. Upper control arm 320 and lower control arm 319 may pivot about chassis support 321, which may be part of the vehicle's body. Spring 315 is coupled to chassis support 321 and lower control arm 319 such that spring 315 supports chassis support 321. Hub 308, upper control arm 320, and lower control arm 319 are unsprung since they are not supported by spring 315 and they move according to a surface of the road the vehicle is traveling on. A damper (not shown) may accompany spring 315 to provide a second order system. Vehicle suspension vertical height sensor 359 outputs an indication of the height of suspension 320 and vehicle 225 relative to ground 399. Tire pressure sensor 306 may transmit a signal representative of tire pressure to vehicle system controller 255 or a receiver 310 that may be electrically coupled to vehicle system controller 255.

FIG. 3C shows another example vehicle chassis suspension 350 for vehicle 225 or a similar vehicle. Tire 312 is mounted to a wheel (not shown) and the wheel is mounted to hub 357. Hub 357 is mechanically coupled to axle 361. Spring 351 is coupled to chassis 355 and axle 361. Hub 308 and axle 361 are unsprung since they are not supported by spring 351 and they move according to a surface of the road the vehicle is traveling on. A damper (not shown) may accompany spring 351 to provide a second order system. Vehicle suspension vertical height sensor 359 outputs an indication of the height of suspension 350 and vehicle 225 relative to ground 399.

The system of FIGS. 1-3C provides for a vehicle system, comprising: an engine coupled to a vehicle; and a controller including executable instructions stored in non-transitory memory to automatically stop the engine responsive to vehicle operating conditions and inhibit automatically starting the engine responsive to an indication of service being performed on the vehicle provided via a vehicle suspension sensor. The system further comprises additional executable instructions stored in non-transitory memory to inhibit automatically starting the engine responsive to an indication of service being performed on the vehicle provided via a fuel rail pressure sensor. The system further comprises additional executable instructions stored in non-transitory memory to inhibit automatically starting the engine responsive to an indication of service being performed on the vehicle provided via an oil level sensor. The system further comprises additional executable instructions stored in non-transitory memory to inhibit automatically starting the engine responsive to an indication of service being performed on the vehicle provided via a camera. The system further comprises additional executable instructions stored in non-transitory memory to inhibit automatically starting the engine responsive to an indication of service being performed on the vehicle provided via inertial sensors. The system further comprising additional executable instructions stored in non-transitory memory to inhibit automatically starting the engine responsive to an indication of service being performed on the vehicle provided via a tire pressure sensor.

Figure 4:
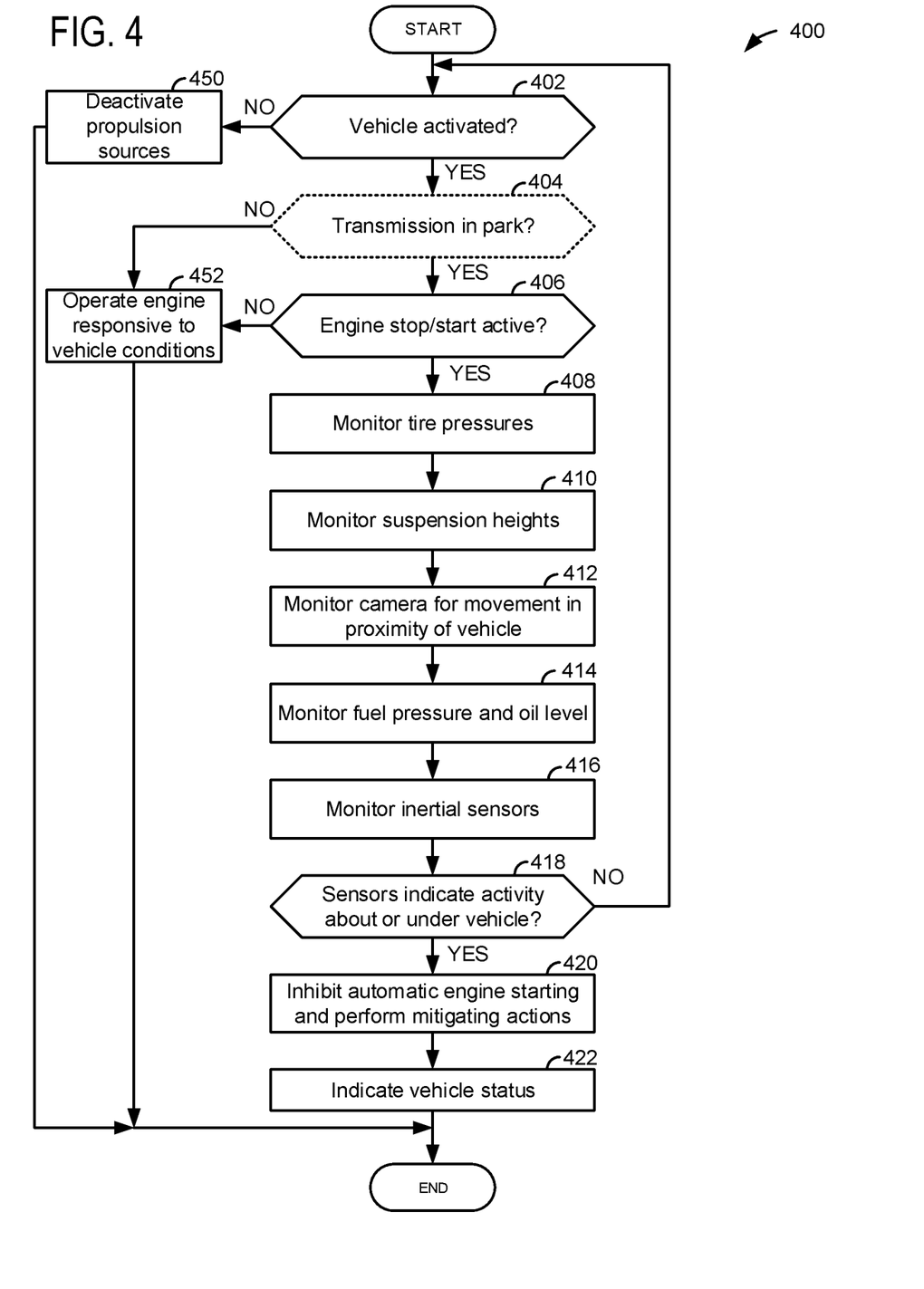
FIG. 4 is a flowchart of a method for operating a vehicle.

Referring now to FIG. 4, an example flow chart of method 400 for operating an engine and vehicle is shown. The method of FIG. 4 may be incorporated into and may cooperate with the system of FIGS. 1-3C. Further, at least portions of the method of FIG. 4 may be incorporated as executable instructions stored in non-transitory memory while other portions of method 400 may be performed via a controller transforming operating states of devices and actuators in the physical world.

At 402, method 400 judges if the vehicle is activated. The vehicle may be activated via a human applying a pushbutton, key switch, or a signal transmitted via a remote device (e.g., a key fob or a phone). Activating the vehicle may comprise pressurizing fuel to a fuel rail and performing other actions to ready the vehicle for travel. Method 400 may judge that the vehicle is activated based on status of a variable that is stored in controller memory. If method 400 judges that the vehicle is activated, the answer is yes and method 400 proceeds to 404. Otherwise, the answer is no and method 400 proceeds to 450.

At 450, method 400 deactivates the vehicle's propulsion sources. The engine may be deactivated by ceasing to supply spark and fuel to the engine. Further, additional actions may be taken to deactivate the engine. For example, electrical power may be withheld from the engine's controller and engine sensors and actuators. For vehicles that include electric machines for propulsion, electrical power may be withdrawn from the electric machines. Method 400 proceeds to exit after deactivating vehicle propulsion sources.

At 404, method 400 optionally judges if the vehicle's transmission shifter and the transmission is engaged in park. The shifter may output its position to the transmission or vehicle controller to indicate the transmission's operating state. If method 400 judges that the transmission is engaged in park, the answer is yes and method 400 proceeds to 406. Otherwise, the answer is no and method 400 proceeds to 452. If step 404 is omitted, method 400 proceeds to 406.

At 406, method 400 judges if engine stop/start control is activated and the engine has been automatically stopped (e.g., the engine has been stopped via the controller without a human driver specifically requesting an engine stop via a dedicated input that has a sole function of requesting stopping and starting of the engine). Method 400 may query a variable in controller memory to determine if engine stop/start control is activated, and method 400 may also query a second variable in memory to determine if the engine has been automatically stopped. The status of these variables may be changed and controlled via the engine controller or the vehicle system controller. Alternatively, method 400 may determine engine stop/start control status and engine operating status via operating states of sensors and actuators. If method 400 judges that engine stop/start control is activated and that the engine has been automatically stopped, the answer is yes and method 400 proceeds to 408. Otherwise, the answer is no and method 400 proceeds to 452.

At 452, method 400 operates the engine responsive to vehicle operating conditions. For example, the engine may be started and run (e.g., rotating the engine's crankshaft and combusting fuel) responsive to driver demand torque. The driver demand torque may be determined via accelerator pedal position and vehicle speed. Further, the engine may be automatically stopped in response to driver demand torque less than a threshold and vehicle speed being less than a threshold. Method 400 proceeds to exit.

At 408, method 400 monitors pressures of each vehicle tired via a plurality of tire pressure sensors. Tire pressure changes may be indicative of service being performed on a vehicle. In particular, if a vehicle is lifted off of the ground via a hoist, air pressure in each of the vehicle's tires may decrease within a predetermined amount of time since the vehicle was lifted off of the ground. The change in all tire pressures may be indicative of the vehicle being lifted via a hoist and the vehicle being service. Thus, if all tire pressures change by a threshold amount of pressure in a predetermined amount of time, then it may be inferred by a controller that the vehicle is undergoing service and/or being lifted.

During some conditions, pressure in one tire of a vehicle may decrease and pressures in one or more other tires of the vehicle may increase. Such conditions may be indicative of a vehicle being lifted via a jack (e.g., a portable vehicle lifting device) at one of the vehicle's wheels. Thus, if pressure in one tire decreases and pressure in one or more tires increase within a threshold amount of time, it may be inferred by a controller that the vehicle is being lifted for service (e.g., a tire change or rotate). Tire sensors may report tire pressures to one or more controllers at predetermined time intervals. A record of tire pressures over a predetermined amount of time may be stored in controller random access memory so that rates of tire pressure change may be determined over a predetermined amount of time.

Additionally, it may be inferred that a vehicle is being serviced if a location of a tire pressure sensor changes or if the signal of the tire pressure sensor is no longer observable. For example, if a front left tire pressure is 240 kilopascals and a rear tire pressure is 210 kilopacals at a first time, and then, the a front left tire pressure changes to 210 kilopascals and a rear tire pressure changes to 240 kilopacals at a second time, it may be inferred that the tire positions have change and that the vehicle is being serviced. Method 400 proceeds to 410 after monitoring tire pressures.

At 410, monitors vehicle suspension vertical height sensor output. The vertical height sensor output may be indicative of vehicle suspension vertical height relative to a base position and vehicle chassis vertical height with respect to ground (e.g., earth). Vehicle chassis vertical height changes may be indicative of service being performed on a vehicle. In particular, if a vehicle is lifted off of the ground via a hoist, vertical height of the suspension and chassis may increase at each of the vehicle's wheels since the vehicle was lifted off of the ground, thereby reducing normal force that is applied to the suspension. The change in chassis and suspension vertical height may be indicative of the vehicle being lifted via a hoist and the vehicle being serviced. Thus, if vertical heights of all suspension components and/or chassis corners change by a threshold amount of distance in a predetermined amount of time, then it may be inferred by a controller that the vehicle is undergoing service and being lifted.

During some conditions, the vertical height of one suspension linkage or chassis corner of a vehicle may increase and vertical height of one or more other suspension linkages may decrease. Such conditions may be indicative of a vehicle being lifted via a jack at one of the vehicle's wheels. Thus, if vehicle suspension or chassis vertical height increases at one wheel and decreases at one or more other wheels within a threshold amount of time, it may be inferred by a controller that the vehicle is being lifted for service (e.g., brake replacement, oil change, etc.). Vehicle vertical height sensors may report suspension height and vehicle chassis height changes to one or more controllers at predetermined time intervals. A record of suspension and chassis vertical height changes over a predetermined amount of time may be stored in controller random access memory so that rates of change in chassis vertical height and suspension vertical height may be determined over a predetermined amount of time. Method 400 proceeds to 412 after monitoring vehicle suspension heights.

At 412, method 400 monitors output of vehicle cameras to determine if there is movement by persons within a predetermined distance of the vehicle (e.g., 1 meter). Camera images may be processed to determine if objects in the images are moving. If objects in the images are determined to be moving and if the objects are within a predetermined distance of the vehicle, it may be inferred that service is being performed on the vehicle (e.g., cleaning, changing windshield wipers, etc.). Method 400 proceeds to 414 after monitoring output of vehicle cameras.

At 414, method 400 monitors output of fuel pressure and engine oil level sensors. A change in fuel pressure (e.g., a reduction in fuel pressure) that is greater than a threshold amount in a threshold amount of time may be indicative that a fuel filter is being changed. In particular, releasing a fuel filter from a fuel line may reduce pressure in a fuel rail. The reduction in fuel rail pressure may be indicative of service that is being performed on a vehicle. The fuel filter may be located under the chassis of the vehicle so that the vehicle's hood is not opened to change the fuel filter, yet the change in fuel pressure may be indicative of service being performed on the vehicle.

Output of an oil level sensor may be monitored to determine that a vehicle's engine oil is being changed. In particular, a drain plug of an engine's oil pan may be removed so that the engine's oil level may be reduced in a short period of time. If the engine oil level changes (e.g., is reduced) by more than a threshold amount in a threshold amount of time, it may be inferred that service is being performed on the vehicle even though the vehicle's hood is not open. Method 400 proceeds to 416 after monitoring fuel rail pressure and oil level sensor output.

At 416, method 400 monitors output of inertial sensors (e.g., yaw, pitch, roll sensors). A change in vehicle position that is greater than a threshold amount in less than a threshold amount of time may be indicative of service being performed on a vehicle. A vehicle's inertial sensor output may change and indicate a change in vehicle position. The change in vehicle position may indicate that the vehicle is being lifted. Method 400 proceeds to 418 after monitoring output of the vehicle's inertial sensors.

At 418, method 400 judges if any of the monitored sensors provide an indication of activity about or under the vehicle. Further, method 400 may judge if any of the monitored sensors provide an indication that the vehicle is being serviced. If one or more of the vehicle sensors indicate activity about or under the vehicle, or if one or more of the vehicle sensors indicate that the vehicle may be in the process of being serviced, the answer is yes and method 400 proceeds to 420. Otherwise, the answer is no and method 400 returns to 402.

At 420, method 400 inhibits automatic engine starting in response to the sensors indicating activity about the vehicle or the vehicle being serviced. Automatic engine starting may be inhibited by not allowing the starter to rotate the engine. Further, delivery of spark and fuel to the engine may be prevented by holding fuel injectors in a closed state and preventing ignition coils from charging. Automatic engine starting may be inhibited from a time when the sensors indicate activity about the vehicle or that the vehicle is being serviced to a time when a human driver requests an engine start via a dedicated engine starting/stopping input (e.g., a key switch or a pushbutton) or overrides the inhibiting of automatic starting. Method 400 proceeds to 422.

At 422, method 400 indicates that the vehicle is in stop/start mode and that automatic engine starting is inhibited. Method 400 may provide a visual indication of the vehicle operating state via a human/machine interface. Additionally, or optionally, method 400 may provide an audible indication of the vehicle's operating mode via an infotainment system or other device. Method 400 proceeds to exit.

In this way, vehicle sensors may indicate that a vehicle is being serviced or that there is activity about the vehicle even when the vehicle's engine compartment hood is closed. The vehicle sensor output may be used to infer that service is being performed on the vehicle at a time when the engine has been automatically stopped. The inference may then be the basis for inhibiting automatic engine starting.

Thus, the method of FIG. 4 provides for an engine control method, comprising: automatically stopping an engine responsive to vehicle operating conditions; and inhibiting automatic starting of the engine in response to an indication that service is being performed on a vehicle while the vehicle's engine compartment hood is closed. The method further comprises monitoring vehicle suspension sensors for the indication that service is being performed on the vehicle. The method further comprises monitoring tire pressure sensors for the indication that service is being performed on the vehicle. The method further comprises monitoring a camera for the indication that service is being performed on the vehicle. The method further comprises monitoring fluid level sensors for the indication that service is being performed on the vehicle. The method further comprises monitoring pressure sensors for the indication that service is being performed on the vehicle. The method further comprises inertial sensors for the indication that service is being performed on the vehicle.

The method of FIG. 4 also provides for an engine control method, comprising: automatically stopping an engine responsive to vehicle operating conditions; inhibiting automatic starting of the engine in response to an indication that service is being performed on a vehicle while the vehicle's engine compartment hood is closed, where inhibiting automatic starting of the engine includes inhibiting automatic starting of the engine to a time when the inhibiting is overridden via a human. The method includes where inhibiting automatic starting of the engine includes not supplying fuel to the engine. The method includes where inhibiting automatic starting of the engine includes not cranking the engine via a starter. The method includes where the indication that service is being performed is a change in an engine oil level. The method includes where the indication that service is being performed is a change in fuel pressure. The method includes where the indication that service is being performed is a change in tire pressure. The method includes where the indication that service is being performed is provided via a camera.

In another representation, the method of FIG. 4 provides for an engine control method, comprising: automatically stopping an engine responsive to vehicle operating conditions, inhibiting automatic starting of the engine in response to an indication that engine oil is being changed, the indication that engine oil is being changed based on output of an engine oil level sensor. The method includes where the indication may be provided when the vehicle's engine compartment hood is closed. The method includes inhibiting automatic engine starting up to a time when the inhibiting is overridden via a human. The method further comprises automatically inhibiting the starting of the engine in response to a change in fuel pressure exceeding a threshold amount in less than a predetermined amount of time.

Figure 5:
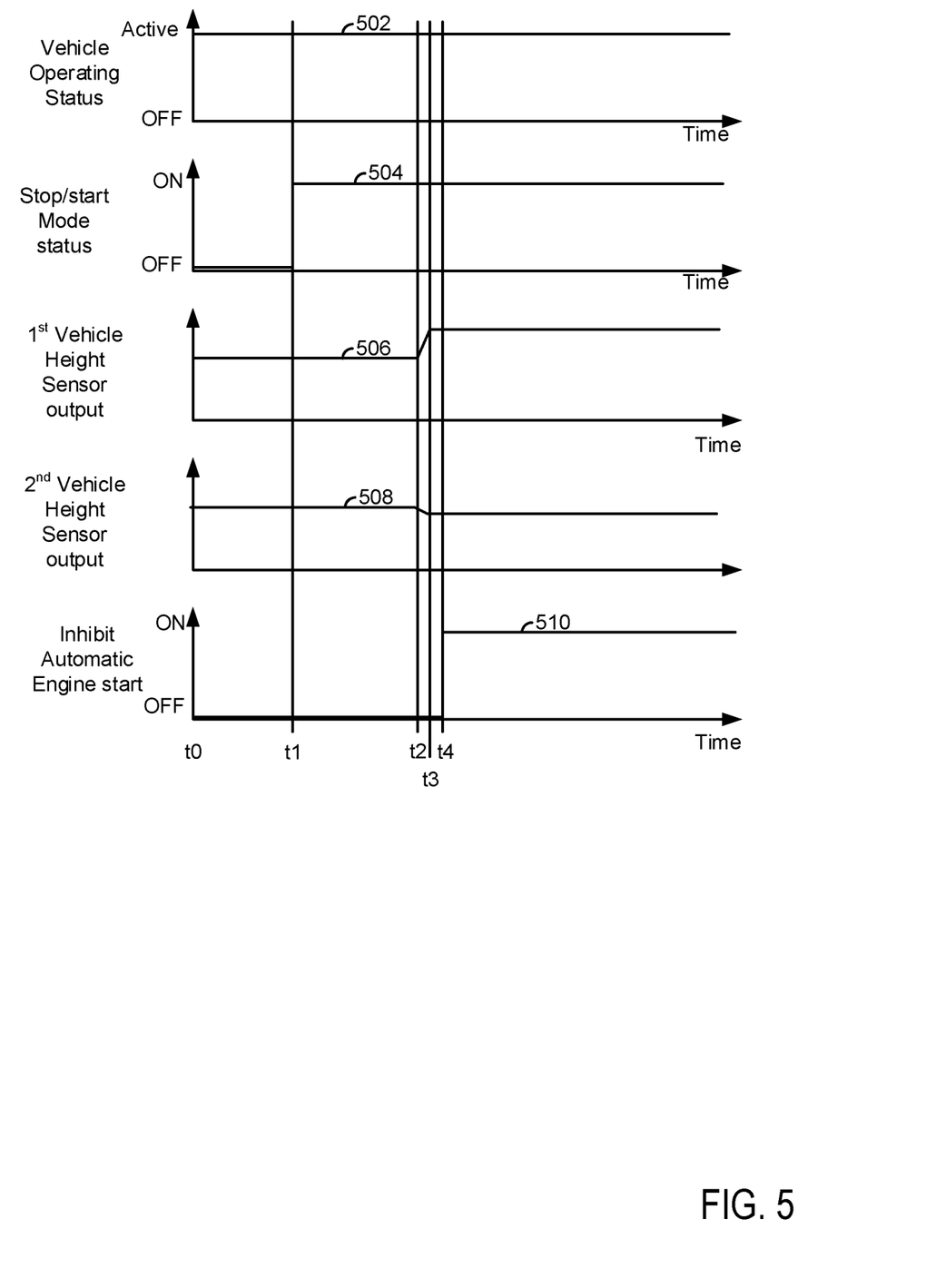
FIG. 5 is an example engine operating sequence according to the method of FIG. 4.

Referring now to FIG. 5, an example vehicle operating sequence is shown. The sequence shown in FIG. 5 may be provided via the system of FIGS. 1-3C in cooperation with the method of FIG. 4. The vertical lines indicate times of interest in the sequence. The plots are aligned in time.

The first plot from the top of FIG. 5 is a plot of the vehicle operating status versus time. The vertical axis represents the vehicle operating status. The horizontal axis represents time and time increases from the left side of the figure to the right side of the figure. Trace 502 represents vehicle operating state. The vehicle is activated when trace 502 is at a higher level near the vertical axis arrow. The vehicle is deactivated when trace 502 is at a lower level near the horizontal axis.

The second plot from the top of FIG. 5 is a plot of the engine stop/start mode operating status versus time. The vertical axis represents the engine stop/start mode operating status. The horizontal axis represents time and time increases from the left side of the figure to the right side of the figure. Trace 504 represents engine stop/start mode operating state. The engine stop/start mode is activated when trace 504 is at a higher level near the vertical axis arrow. The engine stop/start mode is deactivated when trace 504 is at a lower level near the horizontal axis.

The third plot from the top of FIG. 5 is a plot of output of a first vehicle suspension vertical height sensor versus time. The vertical axis represents the first vehicle suspension vertical height. The horizontal axis represents time and time increases from the left side of the figure to the right side of the figure. Trace 506 represents a first vehicle suspension vertical height. The first vehicle suspension vertical height increases in the direction of the vertical axis arrow.

The fourth plot from the top of FIG. 5 is a plot of output of a second vehicle suspension vertical height sensor versus time. The vertical axis represents the second vehicle suspension vertical height. The horizontal axis represents time and time increases from the left side of the figure to the right side of the figure. Trace 508 represents a second vehicle suspension vertical height. The second vehicle suspension vertical height increases in the direction of the vertical axis arrow.

The fifth plot from the top of FIG. 5 is a plot of state of inhibiting of automatic engine starting versus time. The vertical axis represents the state of inhibiting of automatic engine starting operating status. The horizontal axis represents time and time increases from the left side of the figure to the right side of the figure. Trace 510 represents a state of inhibiting of automatic engine starting vehicle operating state. Inhibiting of automatic engine start is activated when trace 510 is at a higher level near the vertical axis arrow. Inhibiting of automatic engine start is deactivated when trace 510 is at a lower level near the horizontal axis (e.g., the engine may be automatically started).

At time t0, the vehicle is activated and the engine (not shown) is running. The engine stop/start mode is not activated and the first vehicle height sensor output is at a middle level. The output of the second vehicle height sensor output is at a same level as the first vehicle height sensor output. Inhibiting of automatic starting is not active.

At time t1, the engine stop/start mode is activated and the engine is automatically stopped (e.g., fuel and spark delivery to the engine ceases and the engine crankshaft ceases rotating) in response to the engine stop/start mode being activated. The output of the first and second vehicle height sensors is unchanged and the vehicle remains activated. Inhibiting of automatic engine start is not activated.

At time t2, the vehicle remains activated and the engine stop/start mode remains activated. The output of the first and second vehicle height sensors begin to change in response to one wheel of the vehicle being elevated (not shown) and inhibiting of automatic engine starting is not activated.

At time t3, the output of the first vehicle suspension vertical height sensor ceases changing and it has increased to indicate that the vertical height of the vehicle has increased at the location of the first vehicle suspension vertical height sensor. The output of the second vehicle suspension vertical height sensor ceases changing and it has decreased to indicate that the vertical height of the vehicle has decreased at the location of the second vehicle suspension vertical height sensor. The combined changes of the first and second vehicle suspension vertical height sensor outputs indicates that one vehicle suspension element is elevated and another vehicle suspension element is compressed, which may indicate that the vehicle is being jacked up on one side. Inhibiting of automatic engine starting is not activated and the vehicle remains activated. The engine stop/start mode remains engaged and the engine remains stopped (not shown).

At time t4, inhibiting of automatic engine starting is asserted so that the engine may not be automatically started in response to the change in the output of the first and second vehicle suspension vertical height sensors between time t2 and time t3. The vehicle remains in an activated state and the engine stop/start mode remains activated; however, in some examples, the engine stop/start mode may be deactivated in response to inhibiting of automatic engine starting. The output of the first and second vehicle vertical height sensors remains unchanged.

Thus, output of the vehicle suspension vertical height sensors may be a basis for determining if service may be in the process of being performed. Further, automatic engine starting may be inhibited based on the output of the vehicle suspension vertical height sensors. Similarly, outputs of the other sensors described herein may also be the basis for determining whether or not a vehicle may be in the process of being serviced.

Note that the example control and estimation routines included herein can be used with various engine and/or vehicle system configurations. Further, the routines may be repeatedly performed. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
  automatically stopping an engine responsive to vehicle operating conditions; and
  inhibiting automatic starting of the engine via a controller in response to an indication that service is being performed on a vehicle as determined via the controller according to output of one or more sensors including vehicle suspension sensors, tire pressure sensors, a camera, fluid level sensors, or inertial sensors.

2. The method of claim 1, further comprising monitoring vehicle suspension sensors for the indication that service is being performed on the vehicle.

3. The method of claim 1, further comprising monitoring tire pressure sensors for the indication that service is being performed on the vehicle.

4. The method of claim 1, further comprising monitoring a camera for the indication that service is being performed on the vehicle.

5. The method of claim 1, further comprising monitoring fluid level sensors for the indication that service is being performed on the vehicle.

6. The method of claim 1, further comprising monitoring pressure sensors for the indication that service is being performed on the vehicle.

7. The method of claim 1, further comprising inertial sensors for the indication that service is being performed on the vehicle.

8. An engine control method, comprising:
  automatically stopping an engine responsive to vehicle operating conditions;
  inhibiting automatic starting of the engine via a controller in response to an indication that service is being performed on a vehicle while the vehicle's engine compartment hood is closed, where inhibiting automatic starting of the engine includes inhibiting automatic starting of the engine to a time when the inhibiting is overridden via a human, and where the indication is provided via one or more of a change in an engine oil level, a change in fuel pressure, a change in tire pressure, or a camera.

9. The method of claim 8, where inhibiting automatic starting of the engine includes not supplying fuel to the engine.

10. The method of claim 9, where inhibiting automatic starting of the engine includes not cranking the engine via a starter.

11. A vehicle system, comprising:
  an engine coupled to a vehicle; and
  a controller including executable instructions stored in non-transitory memory to automatically stop the engine responsive to vehicle operating conditions and inhibit automatically starting the engine responsive to an indication of service being performed on the vehicle provided via a vehicle suspension sensor.

12. The system of claim 11, further comprising additional executable instructions stored in non-transitory memory to inhibit automatically starting the engine responsive to an indication of service being performed on the vehicle provided via a fuel rail pressure sensor.

13. The system of claim 11, further comprising additional executable instructions stored in non-transitory memory to inhibit automatically starting the engine responsive to an indication of service being performed on the vehicle provided via an oil level sensor.

14. The system of claim 11, further comprising additional executable instructions stored in non-transitory memory to inhibit automatically starting the engine responsive to an indication of service being performed on the vehicle provided via a camera.

15. The system of claim 11, further comprising additional executable instructions stored in non-transitory memory to inhibit automatically starting the engine responsive to an indication of service being performed on the vehicle provided via inertial sensors.

16. The system of claim 11, further comprising additional executable instructions stored in non-transitory memory to inhibit automatically starting the engine responsive to an indication of service being performed on the vehicle provided via a tire pressure sensor.

* * * * *